United States Patent [19]

Challapali et al.

[11] Patent Number: 5,243,428
[45] Date of Patent: Sep. 7, 1993

[54] METHOD AND APPARATUS FOR CONCEALING ERRORS IN A DIGITAL TELEVISION

[75] Inventors: Kiran S. Challapali, Ossining, N.Y.; Faramarz Azadegan, Brookfield, Conn.

[73] Assignee: North American Philips Corporation, New York, N.Y.

[21] Appl. No.: 774,006

[22] Filed: Oct. 8, 1991

Related U.S. Application Data

[63] Continuation-in-part of Ser. No. 647,383, Jan. 29, 1991, Pat. No. 5,134,464.

[51] Int. Cl.$^5$ ............................................. H04N 5/21
[52] U.S. Cl. ...................................... 358/167; 371/31
[58] Field of Search .................... 371/31, 41; 358/167, 358/36, 37, 133, 166, 160, 105

[56] References Cited

U.S. PATENT DOCUMENTS

| | | | |
|---|---|---|---|
| 4,792,953 | 12/1988 | Pasdera et al. | 371/31 |
| 4,807,033 | 2/1989 | Keesen et al. | 358/167 |
| 4,829,523 | 5/1989 | Bretl | 371/31 |
| 4,897,724 | 1/1990 | Veldhuis | 358/166 |

OTHER PUBLICATIONS

Darragh et al., "Fixed Distortion Subband Coding of Images for Packet-Switched Networks", IEEE JSAC, vol. 7, No. 5, Jun. 1989.
Veldhuis, "Adaptive Restoration of Unknown Samples in Discrete-Time Signals and Digital Images", Jun. 1988, pp. 1-154.
Wada et al., "Selective Recovery of Video Packet Loss Using Error Concealment", IEEE JSAC, vol. 7, No. 5, Jun. 1989.

*Primary Examiner*—Mark R. Powell
*Attorney, Agent, or Firm*—Michael E. Marion

[57] ABSTRACT

A method and apparatus for concealing errors occurring during the transmission and or reception of digital television signals. Blocks of video information are received and if any of the blocks contain errors including missing coefficients and/or motion vectors which are not correctable by the error correction circuitry, they are concealed by deriving replacement coefficients and/or motion vectors from at least one of the other received blocks of video.

4 Claims, 4 Drawing Sheets

METHOD AND APPARATUS FOR CONCEALING ERRORS IN A DIGITAL TELEVISION

This application is a continuation-in-part of U.S. application 647,383, filed on Jan. 29, 1991, now U.S. Pat. No. 5,134,464, which is specifically incorporated by reference herein

BACKGROUND OF THE INVENTION

The so-called "simulcast" methodology currently favored by the Federal Communications Commission as the basis for advanced television broadcasting in the United States, involves transmitting a conventional television signal, for example NTSC, over a first television channel, and transmitting a high definition television (HDTV) signal over an additional channel which would be assigned to each broadcaster. Since the assignment of an additional channel to each broadcaster will involve the use of those channels currently designated as "taboo" channels (i.e. those restricted for use in a given location), use of those channels will require that a way be found to prevent or minimize within acceptable limits, the interference caused by or to these additional broadcast signals with respect to the existing conventional signals.

The copending parent application describes a method and apparatus for implementing a digital television signal which will eliminate, or minimize to acceptable levels, interference to a conventional television signal present in a related television channel and which is least effected by the conventional television signal.

In order to accomplish its objectives, the parent application comprises a method and apparatus for digital source coding, channel coding, and modulating television information by grouping video data according to perceptual importance and placing the most important ("high priority") data in the part of the transmission channel which is least vulnerable to interference, and the least important ("low priority") data in the part of the channel which is most vulnerable to interference. Vulnerability can be defined in terms of interference from an NTSC signal provided on a co-channel (i.e. "taboo" channel) or the susceptibility of a signal component to drop out due to reduced signal strength.

As with the parent application, the instant invention comprises source coding which can provide, for example, a data stream having a data rate in the vicinity of about 20 Megabits per second (Mb/s). After appropriate multiplexing of digital audio, other digital data (i.e. control signals), and forward error correction and channel coding, the data rate presented to a modulator is nominally about 30 Mb/s. Such a data rate requires a modulation scheme which can deliver nominally 5 bits/sec/Hz in order to transmit this information in a 6 MHz channel. A preferred type of modulation is quadrature amplitude modulation (QAM), for example 64-QAM (64 quantizing levels).

The multi-carrier embodiment of the invention described in the parent application includes means to suitably shape the spectrum of the modulated signal in order to provide different signal-to-noise ratios for different carriers. This provides the flexibility of conveying different types of information (e.g. different codewords or different bits) via different carriers to the decoder. A few examples of relatively high priority information that could be transmitted with low probability of error are motion vectors, the low-frequency coded video (both luminance and chrominance), and intra-frame video coded information (the refresh information). On the other hand, the information with lower priority can consist of high-frequency components in the refresh frame, and the motion-compensated frame-difference information for both luminance and chrominance.

Digital video compression system specifications known as MPEG (Motion Pictures Experts Group) are being developed by a joint ISO/IEC committee. Several digital television systems are being proposed for use in broadcasting, cable television and multimedia applications (for example Compact Disc Interactive) which incorporate and will be compatible with the eventual MPEG standard(s). A concise review of the proposed MPEG specifications is provided by Woodward in his article "An Overview of the JPEG and MPEG Video Compression Specifications" which appeared in 1991 NCTA Technical Papers, pp 135-141, and which is incorporated by reference herein.

As described in the Woodward article, three types of video frame coding are used in accordance with MPEG: intra-coded frames (I), predictive coded frames (P) and bidirectionally predictive coded frames (B). I frames are coded independently from the other frames. They serve as anchors to the P and B frames. The P frames are temporally predicted from previous anchor frames (either I or P frames), and the B frames are interpolated (and/or predicted) from two adjacent anchor frames (either I or P frames). A review of intraframe and interframe video coding is provided by Feher in his book "Advanced Digital Communications", Prentice-Hall, Inc., Englewood Cliffs, N.J. (1987) which is incorporated by reference herein.

In accord with the MPEG protocol, the frames are divided into blocks. A "block" is an orthogonal 8 pel by 8 line section of luminance or chrominance components of an image. A "macroblock" is a 16 pel by 16 line section of the image containing four luminance blocks, two each in the horizontal and vertical directions, and two corresponding chrominance blocks, one for each component. A "slice" is a series of macroblocks in the raster scan order. Macroblocks form I,P or B frames will be described herein as I,P or B macroblocks respectively. A more detailed discussion of these and other details of the MPEG protocol is provided in the publication of the International Organisation For Standardization entitled "MPEG Video Committee Draft", published December, 1990 and a further draft dated May 31, 1991, both incorporated by reference herein.

The slices are coded into bits, grouped into packets and can be transmitted, as discussed in the parent application, as either high priority data or low priority data, the low priority data being more susceptible to bit errors which can occur for example, as a result of noise, timing jitter or electrical interference. The designation and handling of information derived from the macroblocks, as either high priority or low priority, depends upon the degree of importance of the information to reconstructing a good quality image. I frames are accorded the highest priority, and are therefore protected from the effects of errors to a greater degree, since they are the "refresh" frames and provide information from which the B and P frames are predicted. B frames are accorded the lowest priority, and are therefore protected from errors to a lesser degree. Any degradation due to error in a B frame persists only for one frame.

Error correction techniques such as those described in the parent application have, only a limited ability to correct most of the bit errors which can occur either singly or grouped as bursts. Due to the data compression which takes place during the channel coding, even a single uncorrectable bit error can result in the loss of a considerable amount of video data since the entire packet will be effected (and discarded) effecting a number of macroblocks. If a detected error cannot be corrected, it is necessary to replace the missing information in some fashion, i.e. to "conceal" the error.

SUMMARY OF THE INVENTION

An object of the instant invention is therefore to provide a method and apparatus for reconstructing macroblocks which contain uncorrectable errors. This reconstruction will be referred to as "error concealment". It is a further object of the instant invention, to provide an error concealment method and apparatus for use in a decoder or receiver as a part of any digital television or video system which uses an "MPEG-like" specification. These systems include, but are not limited to digital television, video recording/storage and reproduction, and multi-media system such as CD-I, CD-ROMXA, CDV, etc. "MPEG-like" is defined herein as a coding/decoding/transmission system utilizing a specification providing the necessary information elements (for example macroblocks) to perform the inventive reconstruction, without limitation to any one MPEG, or MPEG derived specification.

A bit error occurring in a macroblock will cause the loss of either part or all of the information in a series of macroblocks within the slice. Macroblocks are received at a decoder and the information provided within each is used to reconstruct its corresponding source image part. Heretofore, when information was insufficient within a macroblock to perform this reconstruction (or the reconstruction of dependent macroblocks within a slice), the lack of image information would result in display artifacts.

As described above and in the parent application, error correction methods can be implemented to correct certain errors, however these methods usually involve the transmission of extra error bits which take up valuable space in fixed bandwidth systems which could otherwise be used for actual information bits. As a result, the use of error correction schemes is limited and this in turn limits the range of errors which can be corrected at the decoder.

The instant invention provides for the synthesis of information lost due to uncorrectable bit errors. The lost information in a macroblock is synthesized from one or more neighboring macroblocks. After the missing information is synthesized, thus concealing (as opposed to correcting) the error within the macroblock, the macroblock can then be processed further with the correctly received (and/or corrected) macroblocks.

A causal or non-causal approach is used to obtain information from macroblocks adjacent to, or otherwise neighboring the macroblock containing the erroneous information. In the preferred embodiment described herein, a non-causal approach is taken in which subsequently received macroblocks are used to synthesize missing information in a previously received macroblock. Concealment and reconstruction of the erroneous macroblock is delayed by a little over one raster of macroblocks.

As described in the references incorporated herein, the macroblocks comprise information in the form of coefficients and motion vectors. The invention comprises means for storing a plurality of macroblocks, means for detecting the occurrence of errors which cannot be corrected, means for concealing the uncorrectable errors by synthesizing information from neighboring macroblocks, and means for reconstructing from the coefficients and/or motion vectors supplied by the macroblocks, the relevant portions of the source image.

These and other objects, advantages, aspects and features of the instant invention will be more fully understood and appreciated upon consideration of the following detailed description of the preferred embodiments presented in conjunction with the accompanying drawings.

DETAILED DESCRIPTION OF PREFERRED EMBODIMENTS OF THE INVENTION

Figure 1:
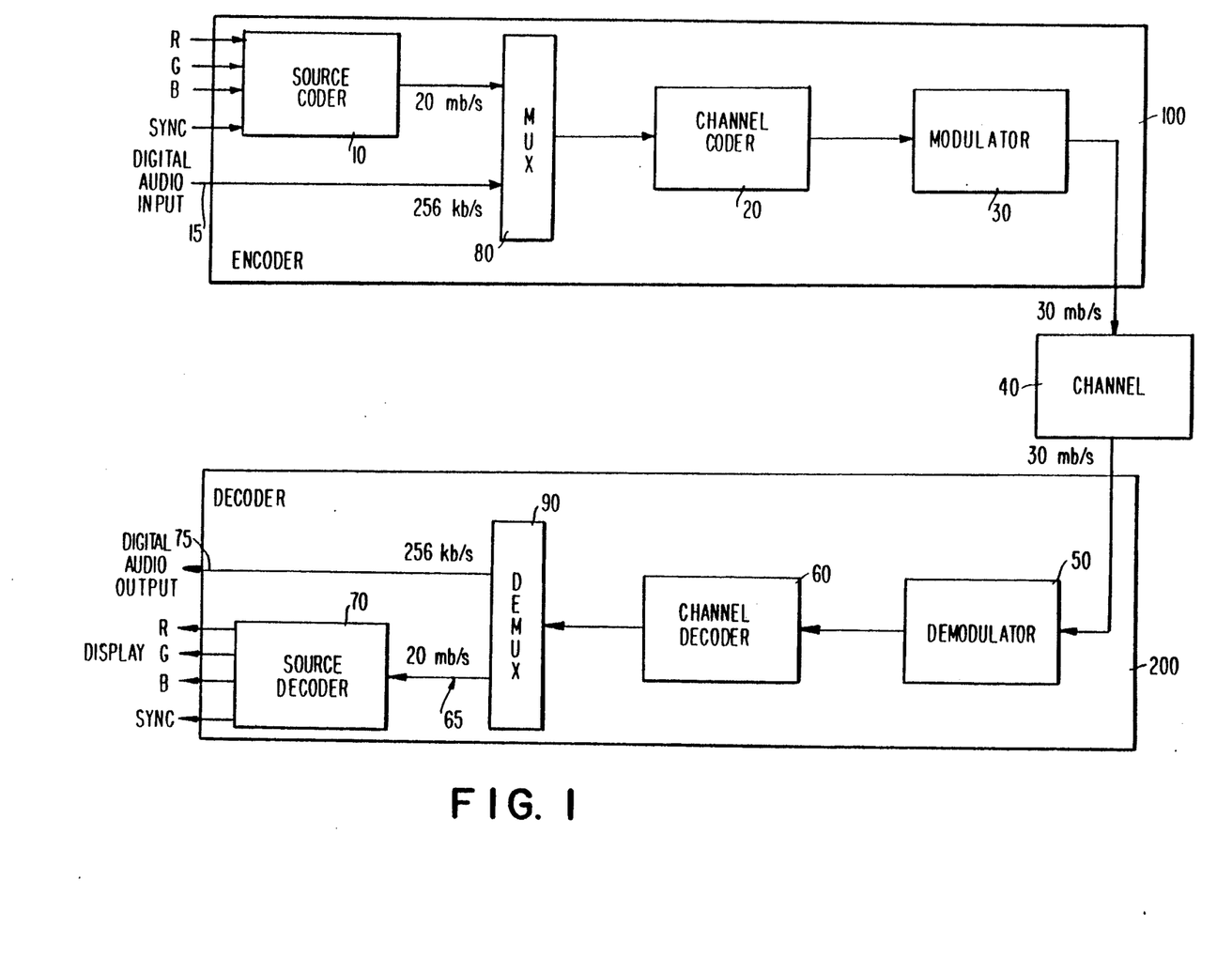
FIG. 1 describes one embodiment of a system for coding, transmitting and decoding a television signal in accordance with the invention.

FIG. 1 describes the transmission and receiving system discussed in the parent application. Encoder 100 can for example, be part of a transmitter or the record circuit of a storage device, and decoder 200 can for example, be part of a receiver or playback circuit of the storage device.

A source coder 10 is provided with video signals, for example RGB signals derived from a high definition source signal together with appropriate sync signals. For purposes of describing the instant invention, we will assume that the source video is RGB or HDTV quality, such as wideband, wide-aspect ratio, 1050/2:1 video. The source encoded data stream has a bit rate which is nominally about 20 Mb/s. A digital audio data signal is provided at input 15 at a bit rate of nominally about 265 kb/s. The source encoded data stream and the audio data are multiplexed in multiplexer 80 and the multiplexed data is then provided to channel coder 20 which performs channel coding for error protection. The data stream provided by channel coder 20 is then modulated onto multiple carriers in modulator 30 forming a digital television signal, having a constant bit rate of nominally about 30 Mb/s, which is carried by a data path or channel 40 which can be a 6 MHz conventional television channel, for example.

The decoder block 200 which can be incorporated into a television receiver, provides processing functions to decode the data stream provided the channel 40. The 30 Mb/s data stream is demodulated in demodulator 50. Channel decoder 60 comprises error correction means for detecting and correcting errors in the bit stream. Means for providing error correction coding, detecting and decoding are well known in the art and will not therefore be discussed in detail herein.

The data stream from channel decoder 60 is demultiplexed in demultiplexer 90 to form a digital audio stream and a video/sync data stream. The audio stream is provided at output 75 and will not be discussed further herein. The video/sync data stream is decoded in source decoder 70 to form video and sync signals which are used to provide a video display.

Source coder 10 provides Discrete Cosine Transform (DCT) processing of the frames which include I, P and B frames. The coded video is in the form of a bit stream where all bits are not of equal value. For example, bits corresponding to motion vectors are given greater value because they must be received by the decoder accurately or else the reconstructed image provided by the decoder will be unacceptable.

The channel coder 20 allows for forward error correction of the bit stream, and when the overhead of error correction, synchronization, and other housekeeping bits are included, the data rate out of the encoder 100 is nominally 30 Mb/s.

The modulator 30 may be a 64 Quadrature Amplitude Modulator (QAM), which transmits the 30 Mb/s data stream within a 6 MHz transmission channel. Other modulation methods, such as quadrature partial response (QPR) can also be used. The combined channel coder and modulator creates a bit stream containing high priority and low priority bits coded as macroblocks.

The channel 40 represents a path or medium having a given bandwidth, which is used to carry the signal encoded by encoder 100 to decoder 200. This channel can be for example, a conventional (i.e. 6 MHz NTSC) terrestrial or cable channel.

The output of the source encoder 10 consists of a string of bits associated with codewords which represent the coded (i.e. compressed) signal. Some codewords convey more important information than others. In addition, the bits in each codeword have different significance. High priority data warrant more protection than low priority data. This can be achieved by using optimized forward error correction techniques (multi-FEC) and/or multi-tier modulation techniques which are known to those skilled in the art, referred to herein as unequal error protection.

Figure 2:
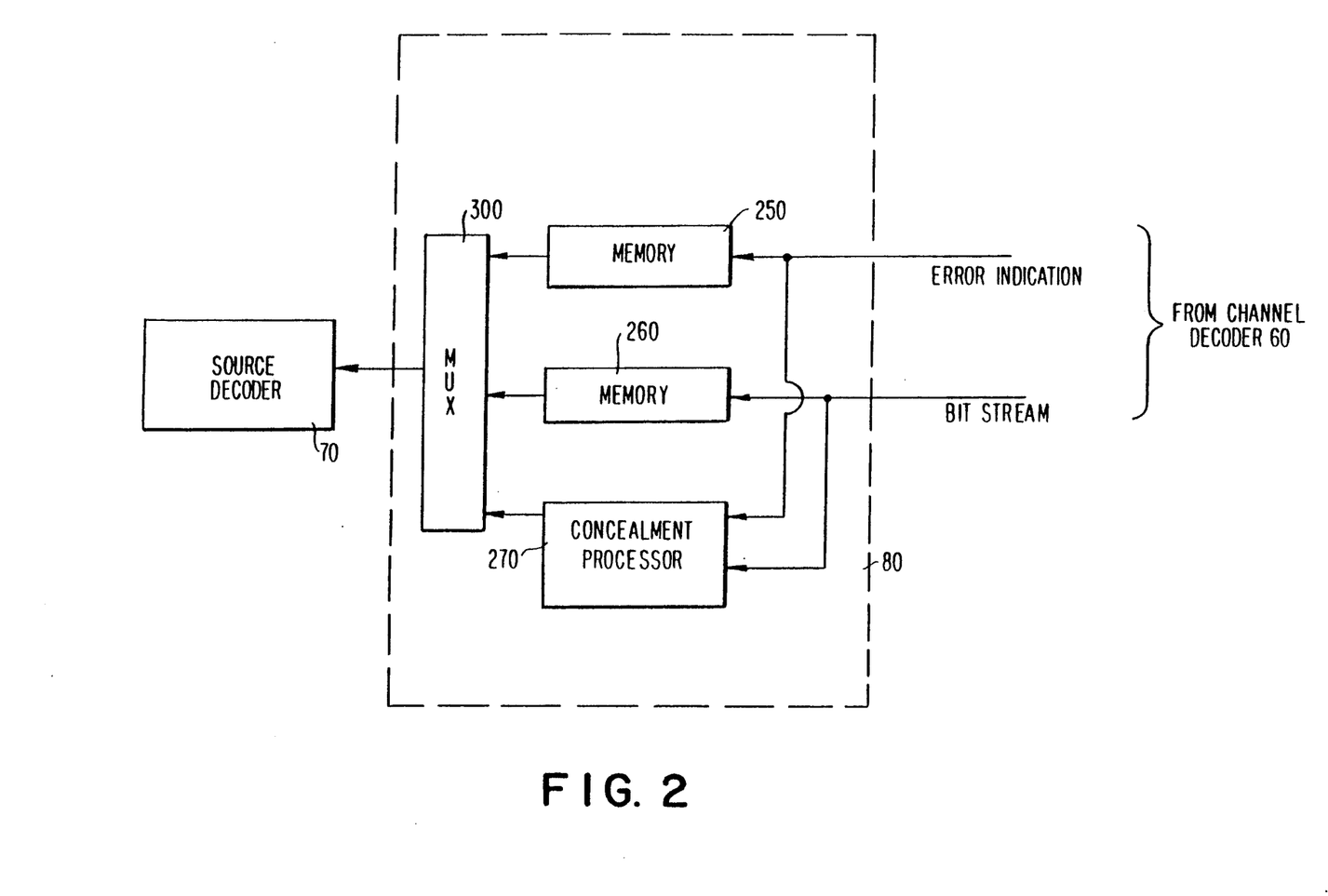
FIG. 2 describes one embodiment of a source decoder comprising the invention.

FIG. 2 describes one embodiment of an apparatus 80 comprising the invention. It can either be incorporated as part of the source decoder 70 or as a separate circuit placed for example at point 65 to receive the video bit stream and error indication information from the demultiplexer, as provided by the channel decoder 60.

As described in more detail below, apparatus 80 stores a plurality of macroblocks and provides as an output to the source decoder 70, either an error free block or a block containing a detected but uncorrectable error (i.e. one which cannot be restored using the error correction techniques) which has been concealed in accordance with the invention, using information synthesized from one or more neighboring blocks.

In the embodiment of the invention described in FIG. 2, code words related to a plurality of blocks are simultaneously received by memory 260 and concealment processor 270. Both the memory 260 and processor 270 provide enough memory to store a plurality of blocks which are related to each other in that they convey temporal and/or spatial information about a contiguous portion of the source image, for example a raster line. Memory 250 receives and stores each error indication bit, which is part of each code word of the bit stream.

It is to be understood that given the required additional storage and processing capabilities, the number of blocks can be greater than the limited number discussed in the examples described below.

Memories 250 and 260 can comprise any type of memory suitable for storing digital information including, but not limited to known types of video frame memories.

Concealment processor 270 can be a programmable or dedicated processing device and incorporates a memory capacity as described above. While memories 250 and 260 are of the FIFO variety, the processor 270 can address any of the data stored in its memory as necessary to perform the concealment procedures described below which involve analysis and combination of information derived from more than one block.

Multiplexer 300 acts as a selection device which provides as an output, either the output from memory 260 or the output from processor 270, depending on the information provided from memory 250. For example, the output of delay 250 provides the error bit for a code word related to block X (where X is an integer). The output of delay 260 provides the block X in its received form. The output of processor 270 provides block X with its errors (if any) as concealed in accordance with the invention.

If an error in block X is detected by the error correction circuitry in channel decoder 60, and that error is one which cannot be corrected, an error indication bit for block X is sent to memory 250 at the same time block X is sent to memory 260 and concealment processor 270.

As described above, the memories 250 and 260, and processor 270 each provide storage for a plurality of blocks. As will be seen in connection with the figures described below, the block X, when finally ready to be processed by multiplexer 300, will be a block delayed in time with respect to those currently being received from channel decoder 60.

When block X information is presented to multiplexer 300 (by memories 250, 260 and processor 270), if the respective output of memory 250 (i.e. the error indication bit of the code word for block X) does not indicate an error in the block X, the output from memory 260, block X as received, is selected by multiplexer 300 and sent to source decoder 70 for reconstruction. If however, the output of memory 250 indicates that an error occurred in block X, the output of processor 270 is selected by multiplexer 300 as its output to source decoder 70. The output of processor 270 represents block X which has had its uncorrectable error concealed by the processor 270 in accordance with the invention. This output is used by source decoder 70 to reconstruct the relevant portion of the image to minimize or eliminate any perceivable artifact.

It is to be understood that one function of the storage provided by memories 250 and 260 and processor 270, is to provide to decision circuit 300, at the proper point in time, information corresponding to block X.

Since only the most important data for a block (or macroblock) is actually synthesized to conceal the error, the time needed to accomplish the synthesis is manageable. Any necessary adjustment to the relative delay times to take into account the time needed to perform the error concealment (if necessary) is well within the capabilities of those skilled in the art and will not therefore be discussed further herein.

The error concealment processing which takes place in processor 270 replaces lost information in blocks of a slice within each frame of video. Errors are concealed differently for the various types of macroblocks (or blocks) I, P and B. In the embodiments discussed below, a non-causal approach is used in which neighboring macroblocks spatially above and to the left, as well as below and to the right of the block in error, are used to provided information to conceal the error. For this reason, the concealment of the erroneous block is delayed by a little over one raster of blocks with respect to the input bit stream to apparatus 80. The invention is not limited however to this approach and may include implementations which involve non-adjacent prior and/or subsequent blocks.

The techniques used for concealing errors depend on the type of frame being processed (I,P or B) and the type of information which is lost (DC coefficients, AC coefficients or motion vectors).

Concealment of I Frame Errors

Two kinds of errors can occur in an I frame; loss of low priority data and loss of higher priority data.

The loss of higher priority information such as headers, DC and AC coefficients, causes severe degradation of the video signal. In the embodiment of the invention described herein, spatial techniques are used to conceal these I frame errors.

DC coefficient values for an erroneous macroblock are synthesized by bilinear interpolation from blocks adjacent to the erroneous block, for example the blocks positioned on top and on bottom of the erroneous block. Since single bit errors cause the loss of data in a series of blocks, the horizontally adjacent blocks (to the left and to the right of the erroneous block) are not used for DC synthesis.

Figure 3A:
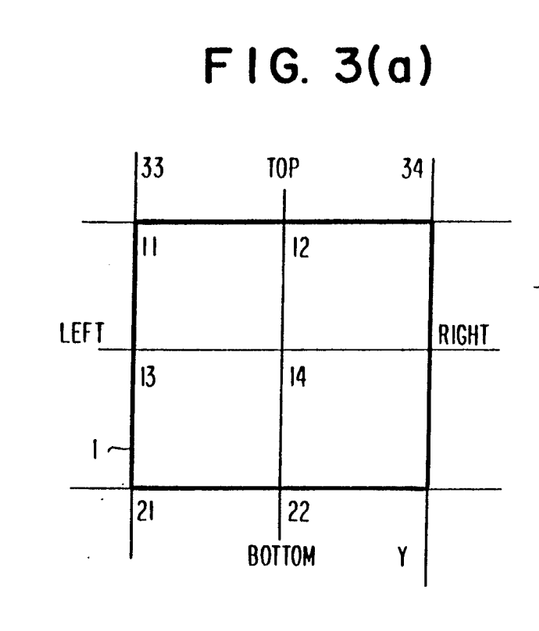
FIGS. 3a, 3b, and 3c graphically describe the synthesis of DC coefficients for an I type frame.
Figures 3B, 3C:
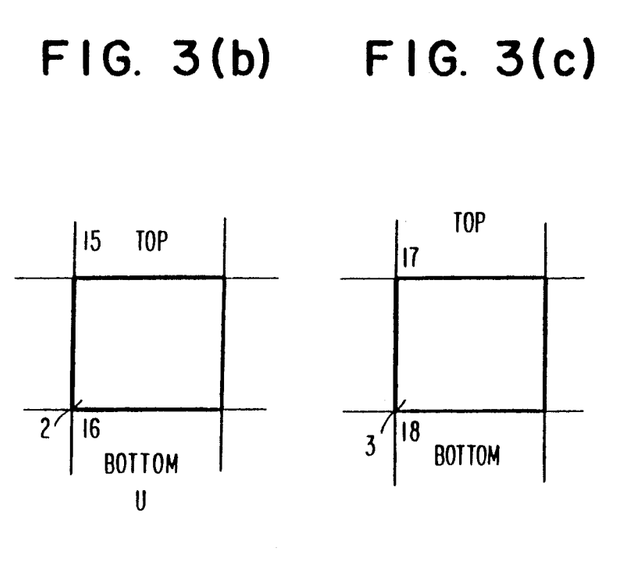

FIGS. 3(a)-3(c) graphically represent a macroblock to be synthesized consisting of four luminance blocks 1 and one block 2 and 3 for each chrominance signal, i.e. U and V. The DC coefficient values for blocks 11 and 13 are synthesized by interpolating the DC coefficient values of blocks TOP 33 and BOTTOM 21 using the formulas:

$$DC_{11} = (2DC_{33} + DC_{21})/3$$

$$DC_{12} = (2DC_{34} + DC_{22})/3.$$

The DC coefficient values for blocks 12 and 14 are synthesized by averaging the DC coefficient values of blocks TOP 34 and BOTTOM 22 using the formulas:

$$DC_{13} = (2DC_{21} + DC_{33})/3$$

$$DC_{14} = (2DC_{22} + DC_{34})/3.$$

The DC coefficient value for chroma block 2 is obtained by interpolating the DC coefficient values of TOP 15 and BOTTOM 16, and the DC coefficient value for chroma block 3 is obtained by averaging the DC coefficient values of blocks TOP 17 and BOTTOM 18.

Figure 4:
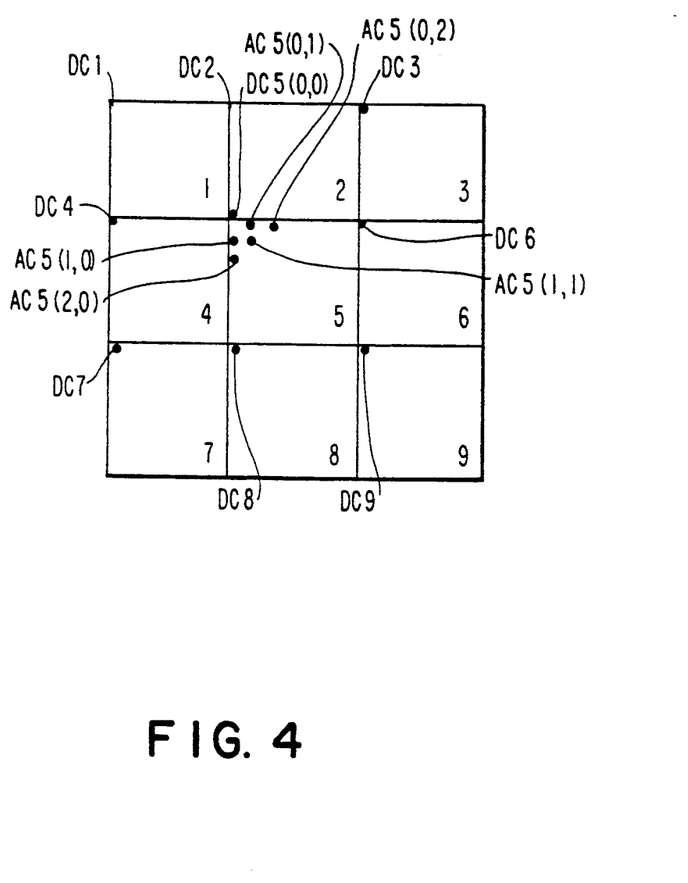
FIG. 4 graphically describes the synthesis of AC coefficients for an I type frame.

In order to reduce the effect of distinct block boundaries, AC coefficients can also be synthesized from nearby blocks. FIG. 4 describes one method of synthesizing five AC coefficients for block 5 which graphically surrounding its DC coefficient DC5.

Each of the blocks shown in FIG. 4 represents an 8×8 matrix of coefficients. Each coefficient can be represented as a set of coordinates m,n where m is the column and n is the row. The DC coefficient of each block is 0,0 (the upper left hand corner). The remaining coefficients are AC coefficients.

The following formulas are used to calculate the AC coefficients:

$$AC5(0,1) = 9.1108 \times (DC4 - DC6)/64$$

$$AC5(1,0) = 9.1108 \times (DC2 - DC8)/64$$

$$AC5(2,0) = 2.2305 \times (DC2 + DC8 - 2 \times DC5)/64$$

$$AC5(1,1) = 1.297 \times (DC1 + DC9 - DC3 - DC7)/64$$

$$AC5(0,2) = 2.2305 \times (DC4 + DC6 - 2 \times DC5)/64$$

These formulas were derived from an algorithm developed by IBM.

Concealment of P and B-frame errors

Some P and B macroblocks comprise motion vector information. Errors which result in the absence of motion vector information must be concealed by synthesizing motion vector information from neighboring macroblocks. Since motion vectors are calculated for macroblocks, rather than individual blocks, the synthesis of information described below on a macroblock basis, except in the case where I frame type synthesis is used. If a P or B macroblock does not contain motion vector information, they are treated as I macroblocks.

For the synthesis of the motion vectors for a given macroblock, we consider the motion vectors of the neighboring macroblocks. Only the top and bottom macroblock information is used in the synthesis process. Information from other neighboring macroblocks can be used to perform consistency check; i.e. to see if the motion vector synthesized is accurate.

One embodiment of the invention comprises the following method for motion vector synthesis in P and B frames as described in Tables I and II.

In order to conceal the absence of motion vectors for a macroblock X, the motion vectors of the top adjacent macroblock and the bottom adjacent macroblock are considered.

1. If both the top and bottom macroblocks have motion vectors defined, then each component of these motion vectors (horizontal and vertical) are averaged and used as the motion vector of macroblock X.

2. If only the top or the bottom adjacent macroblocks have motion vectors defined, which would be the case if for example, either one of them is an I macroblock, or the bottom one is erroneous, then the motion vector which is available is used as the motion vector of macroblock X.

3. If neither the top or the bottom adjacent macroblocks have motion vectors defined, which would be the case if for example, both are I macroblocks, or the top is an I macroblock and the bottom erroneous, then macroblock X is synthesized in the same manner as an I macroblock, described above.

Table I illustrates the method as applied to P frame type macroblocks. This example assumes that the bottom adjacent macroblock is not erroneous.

TABLE I

| MB | | Top MB | |
|---|---|---|---|
| Type | | Forw | Intra |
| Bottom MB | Forw | Forw | Forw |
| | Intra | Forw | Intra |

Table II illustrates the method as applied to B frame type macroblocks. This example assumes that the bottom adjacent macroblock is not erroneous.

TABLE II

| MB Type | Top MB | | | |
|---|---|---|---|---|
| | Forw | Back | Inter | Intra |
| Bottom MB Forw | Forw | Inter | Inter | Forw |
| Back | Inter | Back | Inter | Back |
| Inter | Inter | Inter | Inter | Inter |
| Intra | Forw | Back | Inter | Intra |

In both Tables, "Forw" represents a forward predicted motion vector and "Intra" represents an I macroblock. In Table II, "Back" represents a backward predicted motion vector and "Inter" represents a motion vector which has been predicted by bi-directional interpolation of a prior and subsequent anchor frame, in accordance with the MPEG type protocol discussed above.

The synthesis of information for a macroblock in a P-frame can consist of either a forward predicted motion vector or an I macroblock synthesis. The synthesis of information for a macroblock in a B-frame can consist of either forward or backward predicted motion vectors, bi-directionally interpolated motion vectors or I macroblock synthesis. Bi-directionally interpolated mmacroblocks are calculated from both forward and backward motion vectors.

Forward and backward motion vectors are synthesized independently of each other. For example, if the top macroblock is of the forward type and the bottom macroblock is bi-directionally interpolated then the forward motion vector for macroblock X is obtained by averaging the forward motion vector from the top macroblock and the forward motion vector component of the bottom macroblock, whereas, the backward motion vector is obtained from the backward motion vector component of the bottom macroblock alone.

The foregoing disclosure and description of preferred embodiments of the invention are illustrative and explanatory thereof and various changes in the details of the embodiments shown may be made within the scope of the appended claims without departing from the spirit of the invention.

We claim:

1. A method for concealing errors present in a sequence of blocks provided by a digital video compression system wherein a digital video signal is processed as a sequence of frames, said frames comprising intra-coded frames and predictive coded frames, each of said intra-coded frames comprising blocks which each comprise coefficients derived from said video signal, and each of said predictive coded frames comprising blocks which each comprise motion vectors derived from said video signal, and wherein an error signal is provided for a first block having an error, said method comprising the steps of:
   a) storing said sequence of blocks including said first block so as to provide a sequence of output blocks delayed in time;
   b) storing said error signal so as to provide an output error signal synchronized in time with said first block;
   c) deriving a corrected block comprising information needed to conceal the error in said first block, whereby if said error consists of a loss of a coefficient, said information is replacement coefficient derived from coefficients of at least one of said stored plurality of blocks, and if said error consists of a loss of a motion vector, said information is a replacement motion vector derived from at least one motion vector of at least one of said stored plurality of blocks; and
   d) substituting said corrected block for said first block in said sequence of output blocks in the presence of said output error signal.

2. The method described in claim 1 wherein said blocks of video information are coded from a source image having a first bandwidth to permit conveyance over a channel having a bandwidth which is more narrow than said first bandwidth.

3. An apparatus for concealing errors present in a sequence of blocks provided by a digital video compression system wherein a digital video signal is processed as a sequence of frames, said frames comprising intra-coded frames and predictive coded frames, each of said intra-coded frames comprising blocks which each comprise coefficients derived from said video signal, and each of said predictive coded frames comprising blocks which each comprise motion vectors derived from said video signal, and wherein an error signal is provided for a first block having an error, said apparatus comprising in combination:
   a) first storage means for storing said sequence of blocks including said first block so as to provide a sequence of output blocks delayed in time;
   b) second storage means for storing said error signal so as to provide an output error signal synchronized in time with said first block;
   c) concealing means for receiving said sequence of blocks and said error signal and for deriving, upon detection of said output error signal, a corrected block comprising information needed to conceal the error in said first block, whereby if said error consists of a loss of a coefficient, said information is replacement coefficient derived from coefficients of at least one of said stored plurality of blocks, and if said error consists of a loss of a motion vector, said information is a replacement motion vector derived from at least one motion vector of at least one of said stored plurality of blocks; and
   d) switching means coupled to said first and second storage means and said concealing means, for receiving as a first input said sequence of output blocks, as a second input said output error signal, and as a third input said corrected block, and for substituting, upon detection of said output error signal, said corrected block for said first block in said sequence of output blocks.

4. A television receiver comprising an apparatus for concealing errors present in a sequence of blocks provided by a television signal comprising a sequence of frames, said frames comprising intra-coded frames and predictive coded frames, each of said intra-coded frames comprising blocks which each comprise coefficients derived from said video signal, and each of said predictive coded frames comprising blocks which each comprise motion vectors derived from said video signal, and wherein an error signal is provided for a first block having an error, said apparatus comprising in combination:
   a) first storage means for storing said sequence of blocks including said first block so as to provide a sequence of output blocks delayed in time;

b) second storage means for storing said error signal so as to provide an output error signal synchronized in time with said first block;

c) concealing means for receiving said sequence of blocks and said error signal and for deriving, upon detection of said output error signal, a corrected block comprising information needed to conceal the error in said first block, whereby if said error consists of a loss of a coefficient, said information is replacement coefficient derived from coefficients of at least one of said stored plurality of blocks, and if said error consists of a loss of a motion vector, said information is a replacement motion vector derived from at least one motion vector of at least one of said stored plurality of blocks; and d) switching means coupled to said first and second storage means and said concealing means, for receiving as a first input said sequence of output blocks, as a second input said output error signal, and as a third input said corrected block, and for substituting, upon detection of said output error signal, said corrected block for said first block in said sequence of output blocks.

* * * * *